(12) United States Patent
Perches

(10) Patent No.: US 6,252,891 B1
(45) Date of Patent: Jun. 26, 2001

(54) SYSTEM AND METHOD TO INSERT TIMESTAMP INFORMATION IN A PROTOCOL NEUTRAL MANNER

(75) Inventor: Joseph Perches, Santa Monica, CA (US)

(73) Assignee: Spirent Communications, Inc., Calabasas, CA (US)

( * ) Notice: Subject to any disclaimer, the term of this patent is extended or adjusted under 35 U.S.C. 154(b) by 0 days.

(21) Appl. No.: 09/058,312

(22) Filed: Apr. 9, 1998

(51) Int. Cl.[7] ............................................. H04J 3/06

(52) U.S. Cl. ..................... 370/503; 370/252; 370/218; 370/394

(58) Field of Search .................................. 370/252, 395, 370/218, 242, 352, 412, 247, 384, 391, 390, 394, 498, 503, 508, 487, 589, 263, 235, 401, 34, 244; 714/751; 709/201, 203; 375/224

(56) References Cited

U.S. PATENT DOCUMENTS

| | | | | |
|---|---|---|---|---|
| 4,894,823 | * | 1/1990 | Adelmann et al. | 370/60 |
| 5,517,505 | * | 5/1996 | Buchholz et al. | 370/105.1 |
| 5,600,632 | * | 2/1997 | Schulman | 370/252 |
| 5,784,357 | * | 7/1998 | Wolker et al. | 370/218 |

* cited by examiner

*Primary Examiner*—Dang Ton
*Assistant Examiner*—Anthony Ton
(74) *Attorney, Agent, or Firm*—Blakely Sokoloff Taylor & Zafman

(57) ABSTRACT

A method and apparatus for inserting sequence number and timestamp information into a network data packet in a manner which is checksum neutral with respect to a checksum precalculated in the network protocol portion of the data packet. The checksum neutral addition of sequence number and timestamp is accomplished by in addition to adding to the payload portion a sequence number and timestamp, also adding a value which is a modified version of the sequence number and of the time stamp such as an inverse value.

14 Claims, 5 Drawing Sheets

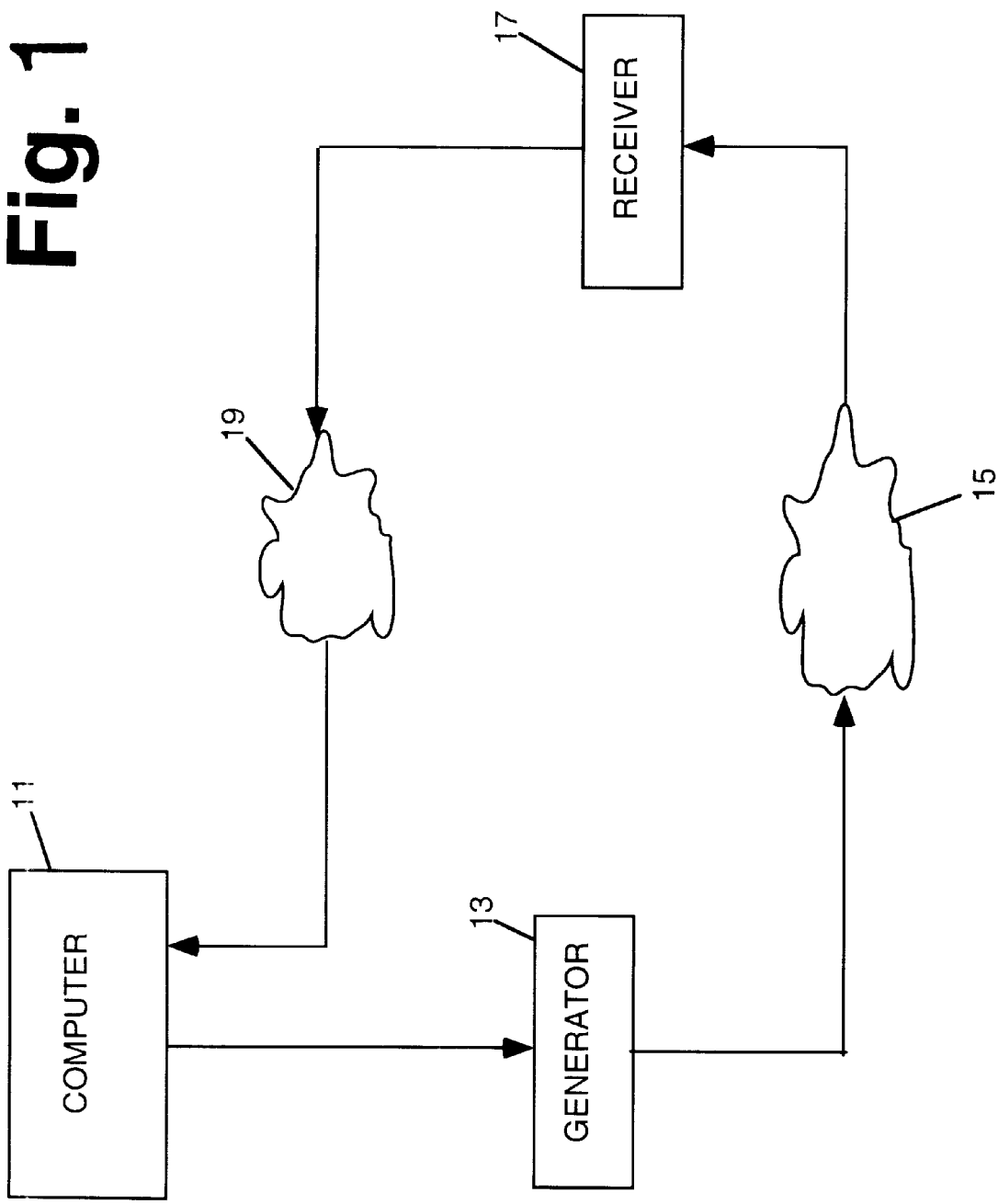

| FIELD NO. | BYTES | DATA |
|---|---|---|
| NETWORK PROTOCOL PORTION | | |
| 0.1 | | NETWORK PROTOCOL INFORMATION |
| 0.2 | | CHECKSUM |
| PAYLOAD PORTION | | |
| 1 | 8 | MARKER |
| 2 | 2 | USER PAYLOAD BYTE COUNT |
| 3 | 1-N | USER PAYLOAD |
| 4 | 2 | CRC-16 (CCITT) OF FIELDS 2 AND 3 |
| 5 | 4 | ID# (PORT, STREAM, PROTOCOL, USER DEFINED DATA) |
| 6 | 2 | SIGNATURE SEQUENCE# |
| 7 | 2 | SIGNATURE SEQUENCE# |
| 8 | 4 | SIGNATURE TIMESTAMP |
| 9 | 4 | SIGNATURE TIMESTAMP |
| 10 | 0-3 | PAD |
| 11 | 0-4 | FRAME CHECK SEQUENCE |

Fig. 2a

| NETWORK PROTOCOL | PAYLOAD | | | | | | | | | | |
|---|---|---|---|---|---|---|---|---|---|---|---|
| | 1 | 2 | 3 | 4 | 5 | 6 | 7 | 8 | 9 | 10 | 11 |

Fig. 2b

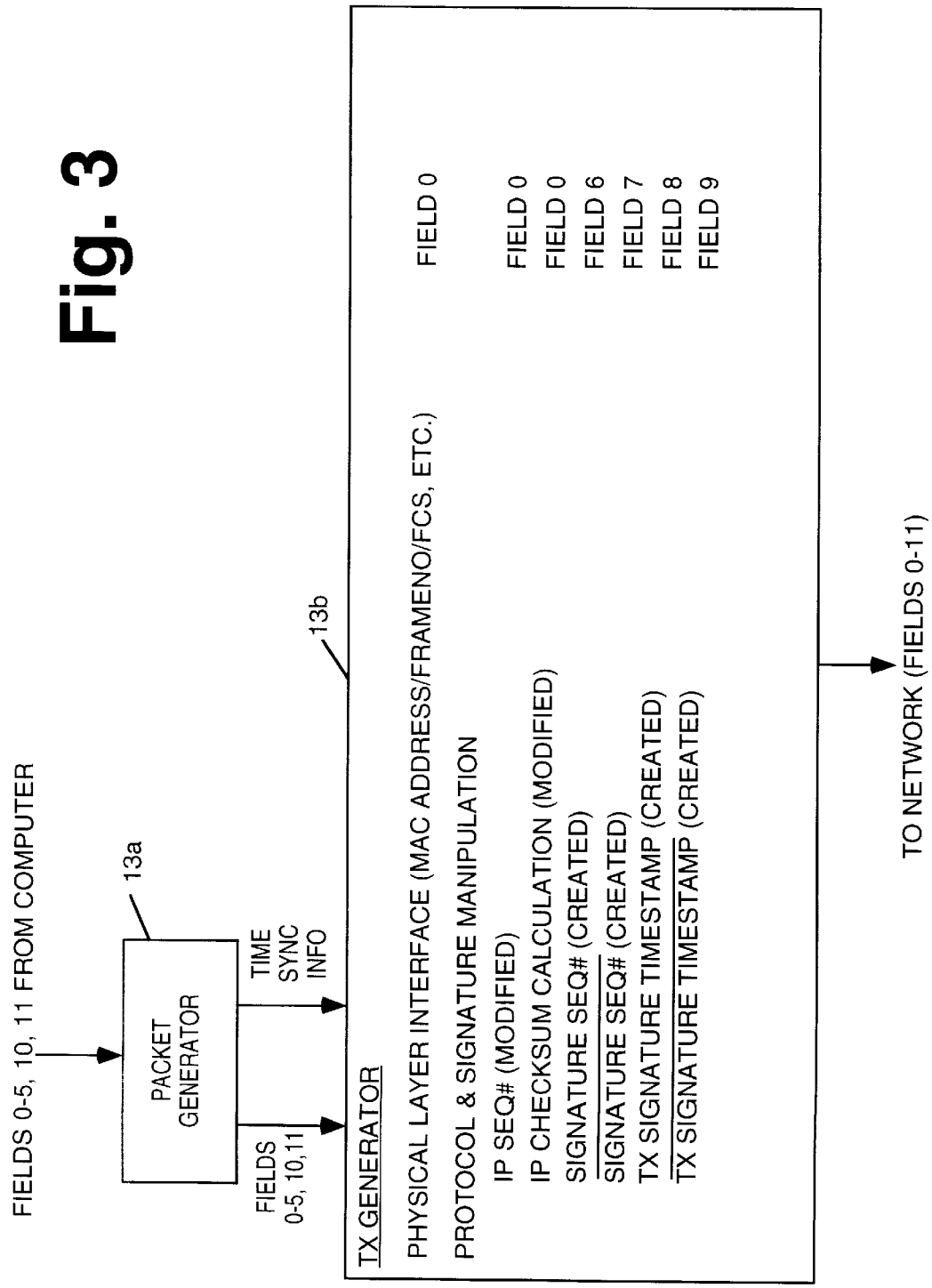

LOGICAL BLOCK DIAGRAM OF RECEIVER

SYSTEM AND METHOD TO INSERT TIMESTAMP INFORMATION IN A PROTOCOL NEUTRAL MANNER

BACKGROUND OF THE INVENTION

The invention has application in the field of network traffic generators and analyzers. More particularly, the invention is directed to a mechanism to insert information in the payload portion of a packet in a protocol neutral way.

Network traffic generators and analyzers are devices used to provide information for use by network administrators to determine the efficiency of the flow of packets over a network and to determine where network bottlenecks exist or may exist. For example, a network, such as a local area network (LAN) or wide area network (WAN) will have connected at several nodes of the network, a network traffic generator which generates packets, which packets are generated using a predetermined software protocol such as IP, IPX, SPX, ICMP, ARP, or RARP, Appletalk, DECNET or SNA, each of which is defined in an industry standard manner.

The software or data communications protocols noted above are independent of the media access control (MAC) utilized such as Ethernet or Token Ring.

In order to conduct certain analysis of network traffic, it is desirable to have a timestamp associated with each data packet, which timestamp has a value representing the time at which the packet is placed onto the network being tested so that when the packet is received by a receiving unit, the timestamp in the packet can be compared with a timestamp generated when the packet is received. Another piece of information necessary to perform such analysis is a sequence number associated with each packet.

Thus, while having sequence number and timestamp information within the body of a packet is desirable to enable certain types of analysis to be performed, under commonly utilized software protocols, such as those noted above, it is not possible to add timestamps and sequence number information to a packet without changing the value of a checksum which is necessarily calculated prior to the time the timestamp and sequence number can be added to the packet.

Each packet is generated by a computer and includes a network protocol portion and a payload portion. Referring for example to FIG. 2a, the network protocol portion includes network protocol information and the checksum. Referring to FIG. 1, the checksum is a value calculated by computer 11, based upon information contained in the payload portion, specifically fields 1–5 and fields 10–11 shown in FIG. 2a. When a packet is received, receiving unit 17 recalculates the checksum using the data in the payload portion of the packet. The calculated checksum is then compared with the checksum in the network protocol portion. If the two values do not agree, then it is assumed that the packet was transmitted in error and, typically, a request is made to have the packet re-transmitted.

Since the timestamp and sequence number information are added by generator 13 before placing the packet onto network 15, such information must be added to the packet after the checksum has been calculated. However, as noted above, since the checksum that the receiver calculates is calculated using the contents of the entire payload portion, adding a sequence number and timestamp to the payload portion will cause a different checksum to be calculated than the one in the network protocol portion which in turn causes extraneous packets to be transmitted or otherwise adversely impacts the analysis performed based on the transmitted and received packets.

While it is possible to provide sequence number and timestamp information by computer 11, the timestamp provided by computer 11 would not accurately reflect the time at which the packet is actually placed onto the network by generator 13. While mechanisms could be utilized to compensate for the differential between the time a packet is generated by a computer, and the time it is placed onto the network, such mechanisms would introduce some amount of error. While such errors can be tolerated in certain network environments, as networks speeds have increased, the need for more accurate analysis based on accurate timestamp information becomes more important.

U.S. Pat. No. 5,600,632 recognizes the desirability of having a timestamp whose value can be compared with the time a packet is received by a receiving unit, and teaches various mechanisms for ensuring that clocks in transmitting units and receiving units are synchronized. U.S. Pat. No. 5,600,632 also recognizes the need for synchronizing network analyzers so that timestamps applied to packets will be consistent and accurate through the network. See column 7, lines 31–34. However, this patent contains no teachings or suggestions for applying a timestamp by a network traffic generator in a way which ensures that the checksum in the network protocol portion of a packet will compare with the checksum calculated by a receiving unit.

SUMMARY OF THE INVENTION

The invention is directed to a method and apparatus for inserting sequence number and timestamp information into a network data packet in a manner which is checksum neutral with respect to a checksum precalculated in the network protocol portion of the data packet. In one embodiment, the checksum neutral addition of sequence number and timestamp is accomplished by in addition to adding to the payload portion a sequence number and timestamp, also adding a value which is an inverse of the sequence number and an inverse of the time stamp.

BRIEF DESCRIPTION OF THE DRAWINGS

FIG. 1 is a block diagram of a system in connection with which the present invention may be utilized.

FIG. 2a & 2b are representations of a typical data packet.

FIG. 3 is a logical block diagram of generator 13.

DETAILED DESCRIPTION OF THE INVENTION

Figure 4:
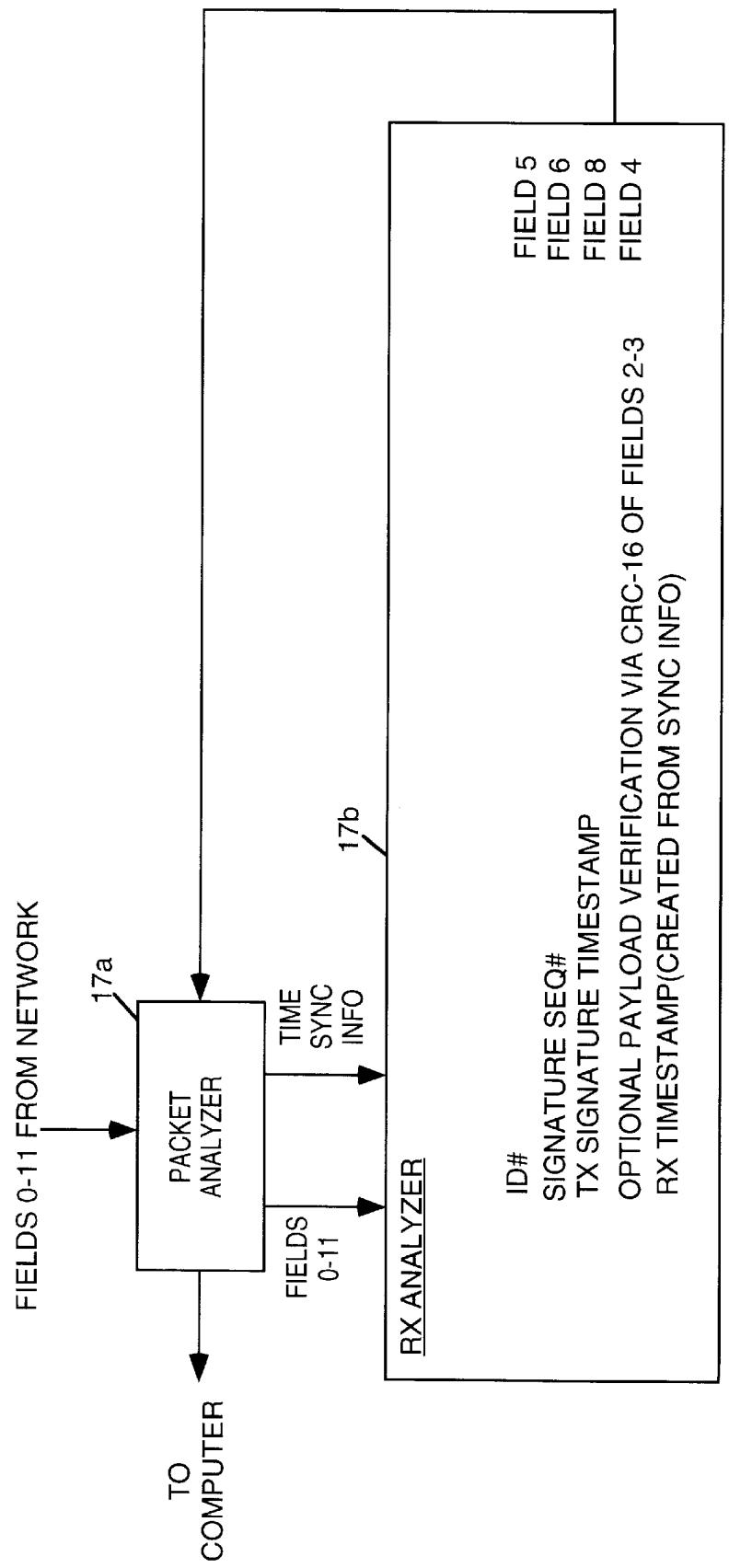
FIG. 4 is a logical block diagram of receiver 17.

Referring to FIG. 1, the present invention is hardware and software elements forming part of generator 13 which cause sequence number and timestamp information to be added to data packets in a protocol neutral manner.

Computer 11 may be any general purpose computer such as a PC running a Windows or Macintosh operating system or a UNIX workstation. Software and hardware in computer 11 generate data packets intended to be sent over network 15 to a desired destination. In a system employing network analyzers, data packets, before being transmitted onto network 15, pass through generator 13 which modifies certain information in the data packets before sending them on to network 15. The data packets are intercepted by receiver 17 which provides additional information, including the time the packet was received, before sending it over network 19. Network 19 may or may not be the same as network 15. The packet passes through network 19 to its ultimate destination, which in the case of a system undergoing an analysis of network traffic typically would be the same, although not necessarily, computer 11.

As shown in FIG. 2*a*, a data packet has a network protocol portion and a payload portion. The network protocol portion contains network protocol information and a checksum which is calculated as described below. The payload portion includes a marker (field 1) which is defined by the test to be undertaken by the network analyzer and may be a unique pattern or based on a predefined algorithm. The next field is the user payload byte count (field 2) which is simply the byte count of the user payload (field 3) which is the next field which may be from one to N bytes. The content of the user payload, in a packet transmitted for purposes of performing network analysis, except for initial value information in the first packet, is not critical. The next field is a sixteen bit cyclical redundancy check field (field 4) calculated using the user payload byte count and the user payload field according to a CCITT standard. The next field is an ID number (field 5) which is formed from an 8 bit port number, a 16 bit stream value, a 4 bit protocol value and 4 bits of user defined data. Port number is a generator identifier; stream defines a particular connection between a transmitter and a receiver; the protocol is the software protocol being used; and user defined data is used to augment the port, stream or protocol data as needed. Pad data (field 10) may be needed for alignment depending on the physical medium used for the network. Frame check sequence (field 11) may or may not be needed depending on the software protocol. The first five fields as well as field 10 and field 11 are all generated by computer 11.

Referring now to FIG. 3, which is a logical block diagram of generator 13, a packet with fields 0–5, 10 and 11 are input into a packet generator 13*a* which performs various well known functions. One example of a suitable packet generator is sold by Netcom Systems as its model SMB1000 or SMB2000. The present invention in effect adds functionality to such prior art packet generator utilizing a transmit generator shown as element 13*b* in FIG. 3, which in addition to modifying what is know as the IP sequence number and IP checksum calculation in field 0 in the network protocol portion of the header as required by the software protocol, also adds a signature sequence number and a transmit signature timestamp. The signature sequence number is created by incrementing from an initial value contained in the payload portion of the first packet used in the test. The transmit signature timestamp value is obtained from a clock in generator 13*a*. In order to ensure that the addition of the signature sequence number and signature timestamp do not change the value of the checksum calculated for the payload portion of the packet, each field is input to a bit by bit inverter which places a bit by bit inverse of the signature sequence number and signature timestamp value at fields 7 and 9 of the payload portion. By inserting these inverse values, when the packet is received, and the checksum of the payload is calculated, the calculated checksum will be the same as the checksum previously calculated by computer 11 in the network protocol portion of the packet.

In this connection, it should be recognized that the only requirement regarding the additional data to add to the payload portion is that such additional data must contain a value which does not cause the payload portion to have a different checksum calculated after the data has been added. Thus, while a bit by bit inverse is a preferred embodiment in that the use of inverters makes it easy and inexpensive to implement in hardware, it would also be possible to utilize the two's compliment of the sequence number and timestamp values by adding a first portion, such as the first 2 bytes, of the timestamp value to a second portion, such as the second 2 bytes, of the timestamp value. Similarly, it is not necessary that the sequence number field be followed by its inverse and then the timestamp value field be followed by its inverse. Thus, for example, the sequence number field could be followed immediately by the timestamp value, and then an inverse of the combined sequence number timestamp fields could be inserted after the two combined fields. It should be understood that the checksum value is calculated based on the software protocol utilized, and it would possible to add modified values of the sequence number and timestamp which would also result in a checksum neutral calculation.

FIG. 4 is a logical block diagram of receiver 17. Receiver 17 includes a packet analyzer module 17*a* and a receive analyzer module 17*b*. Both of these modules would typically be implemented as part a network traffic analyzer which would include generator 13 and receiver 17 in a single unit. As noted above, such network traffic analyzers are well known in the art, one example being model SMB1000 or SMB2000 sold by Netcom Systems. Although the receiver portion of a network analyzer represented by receiver 17 does not differ from the equivalent module in the prior art, one piece of information provided by the receive analyzer 17*b* is the receive timestamp which is created from sync information generated by a clock within packet analyzer 17*a*.

Of course, in order to ensure that the receive timestamp and the transmit timestamp contain timestamp information which can be correctly analyzed, it is necessary that the clocks in generator 13 and receiver 17 be synchronized. However, such synchronization can be accomplished by well known prior art solutions such as used in global positioning systems.

Figure 5:
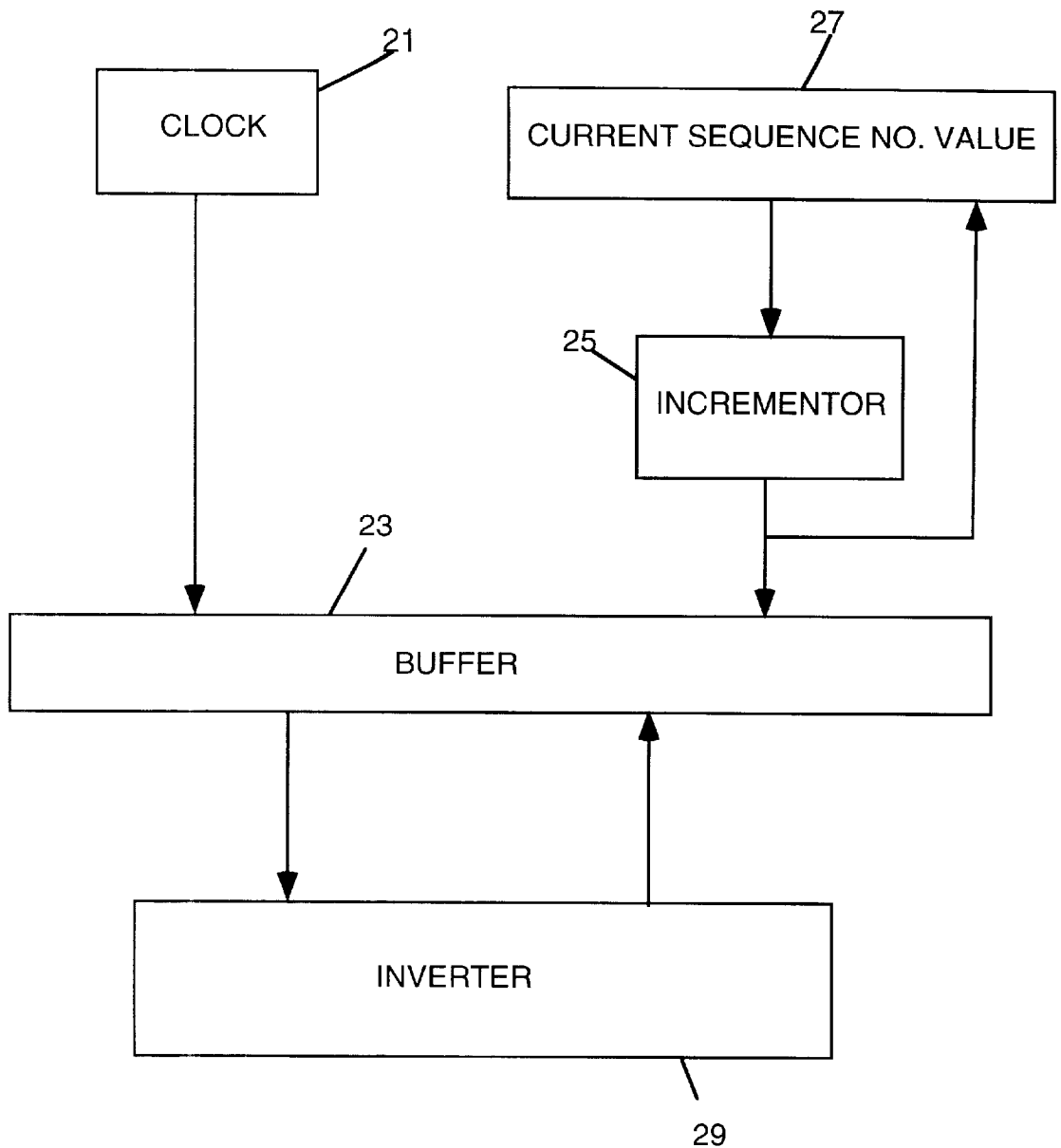
FIG. 5 is a block diagram of elements of a transmit generator.

Referring now to FIG. 5, the elements of a suitable transmit generator for implementing the present invention will now be described. A clock 21 local to packet generator 13*a* generates a time stamp value for the current packet to be transmitted over the network, which value is stored in a memory such as buffer 23. Similarly, an incrementor 25 increments a current sequence number value 27, and stores the incremented value in buffer 23. The incremented value is also stored as the current sequence number value for use by the next packet to be transmitted. As noted above, the initial sequence number value is obtained from the payload portion of the first test packet. The time stamp and sequence number value stored in buffer 23 are then inverted by inverter 29, and the inverted values are also stored in buffer 23. The values in buffer 23 are used to form the corresponding portions of the payload as described above. Of course, there may be several buffers or memory areas to store the various values, and there may be other logic circuitry necessary to transfer the various values in buffer 23 to another memory or buffer containing the complete packet to be transmitted, however, such additional logic and/or memory, if necessary, would be readily apparent to persons skilled in the relevant art. Accordingly, such additional details are not set forth herein.

I claim:

1. A method for adding a sequence value and a timestamp value to a packet having a predetermined checksum contained therein, said packet to be transmitted over a network, said method comprising the steps of:

a) determining the timestamp value to be added to said packet;
b) determining the sequence value to be added to said packet;
c) inserting the sequence value and timestamp value within said packet;
d) inserting a value which is a version of said sequence value and a value which is a version of said timestamp value within said packet, wherein said sequence version value and said timestamp version value are selected such that said predetermined checksum value remains a valid checksum value for said packet after said insertion.

2. The method defined by claim 1 wherein said packet includes a network protocol portion and a payload portion, and the timestamp value, the timestamp version value, the sequence value and the sequence version value are inserted within said payload portion.

3. The method defined by claim 1 wherein the timestamp value is a value relative to a start of test time.

4. The method defined by claim 1 wherein the timestamp version value is a bit by bit inverse of the timestamp value.

5. The method defined by claim 1 wherein the sequence value is a number relative to an initial value.

6. The method defined by claim 1 wherein the sequence version value is a bit by bit inverse of the sequence value.

7. The method defined by claim 1 wherein the timestamp version value is a two's complement of a value formed by adding a first portion of said timestamp value to a second portion of said timestamp value.

8. The method defined by claim 1 wherein the sequence version value is a two's complement of a value formed by adding a first portion of said sequence value to a second portion of said sequence value.

9. A system for adding a sequence value and a timestamp value to a packet having a predetermined checksum contained therein, said packet to be transmitted over a network, said system comprising:
a) a network traffic generator;
b) means for determining the timestamp value to be added to said packet;
c) means for determining the sequence value to be added to said packet;
d) means for inserting the sequence value and timestamp value within said packet;
e) means for inserting a value which is a version of said sequence value and a value which is a version of said timestamp value within said packet, wherein said sequence version value and said timestamp version value are selected such that predetermined checksum value remains a valid checksum value for said packet after said insertion.

10. The system defined by claim 9 wherein the means for determining the timestamp value comprises a clock local to said network traffic generator.

11. The system defined by claim 9 wherein the means for determining the sequence value comprises an incrementor local to said network traffic generator.

12. The system defined by claim 9 wherein the means for inserting the sequence value and timestamp value comprises:
a) a first buffer coupled to said clock, said first buffer adapted to store said timestamp value obtained from said clock;
b) a second buffer coupled to said first buffer and said incrementor adapted to store the timestamp value stored in said first buffer and said sequence value generated by said incrementor.

13. The system defined by claim 12 wherein said means for inserting a value which is a version of said sequence value and a value which is a version of said timestamp value comprises an inverter coupled to said second buffer.

14. A system for adding a sequence value and a timestamp value to a packet having a predetermined checksum contained therein, said packet to be transmitted over a network, said system comprising:
a) a network traffic generator;
b) a clock local to said network traffic generator;
c) an incrementor local to said network traffic generator;
d) a first buffer coupled to said clock, said first buffer adapted to store said timestamp value obtained from said clock;
e) a second buffer coupled to said first buffer and said incrementor adapted to store the timestamp value stored in said first buffer and said sequence value generated by said incrementor;
f) an inverter coupled to said second buffer.

* * * * *